March 13, 1928.   1,662,340

V. E. SCHMIEDEKNECHT

MOLDING DEVICE

Filed Feb. 26, 1926   3 Sheets-Sheet 1

INVENTOR
Victor E. Schmiedeknecht.
BY
E. J. Markson
ATTORNEY

March 13, 1928.
V. E. SCHMIEDEKNECHT
1,662,340
MOLDING DEVICE
Filed Feb. 26, 1926
3 Sheets-Sheet 2
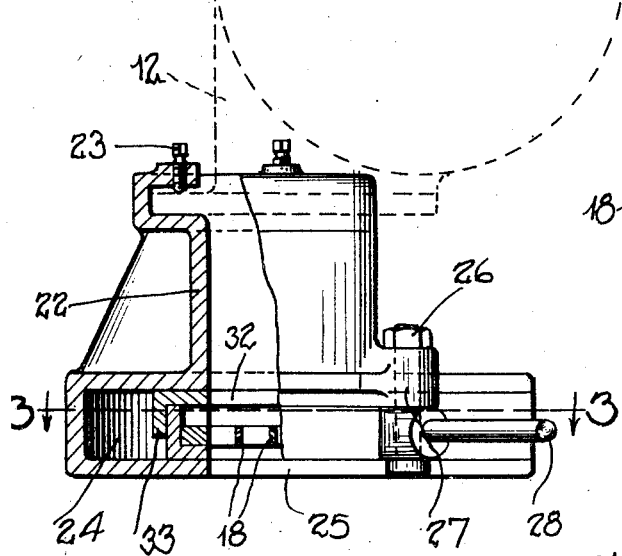
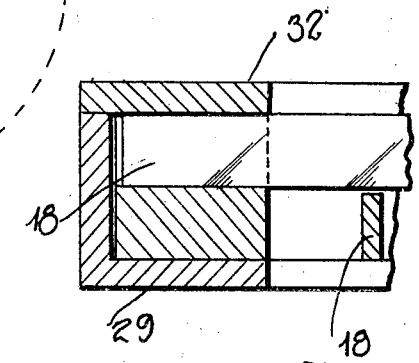
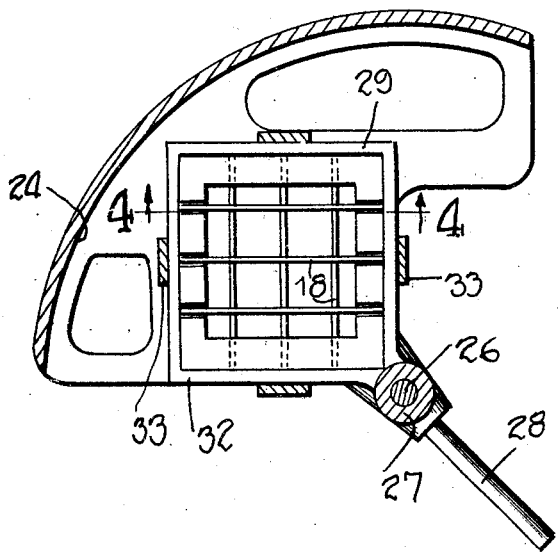
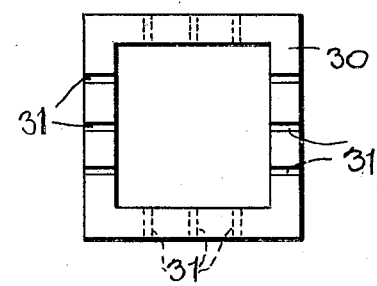
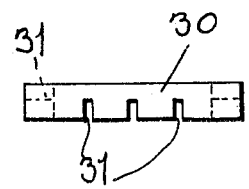
INVENTOR
Victor E. Schmiedeknecht.
BY
E. J. Markoon
ATTORNEY March 13, 1928.　　　V. E. SCHMIEDEKNECHT　　　1,662,340
MOLDING DEVICE
Filed Feb. 26, 1926　　　3 Sheets-Sheet 3

INVENTOR
Victor E. Schmiedeknecht.
BY
E. J. Clarkson
ATTORNEY

Patented Mar. 13, 1928.

1,662,340

UNITED STATES PATENT OFFICE.

VICTOR E. SCHMIEDEKNECHT, OF LOUISVILLE, KENTUCKY, ASSIGNOR OF ONE-HALF TO GOHMANN BROTHERS AND KAHLER COMPANY, OF NEW ALBANY, INDIANA, A CORPORATION.

MOLDING DEVICE.

Application filed February 26, 1926. Serial No. 90,873.

This invention relates to molding devices and processes such as are used in the forming of sand molds for casting articles in iron, brass and other metals.

More particularly the invention relates to molding devices of the type known as "sandslingers" wherein the molding sand is formed into wads or slugs and forcibly thrown into the flask containing the pattern, and to the process of molding patterns with such machines. As a type of the machine referred to may be mentioned the sandslingers manufactured by the Beardsley and Piper Company of Chicago, Illinois.

In such machines the sand is delivered from the machine head in comparatively large slugs or wads and experience has shown that sand thus thrown into the flask does not always properly fill the space around the pattern, this being due to the slugs retaining more or less of their original size and shape so that interstices are left at the surface of the pattern between it and the mass of sand with the result that rough and uneven castings are produced when it is sought to cast in such molds.

Again, in the productive use of present sand projecting devices, applied to the ramming of sand molds in the process of making metal castings, there exist certain practical defects with regard to the manner in which the sand is projected into the mold, and principally with regard to the lack of means for varying or controlling the intensity with which the sand is bedded upon the pattern and within the bounds of the flasks.

It is a well known fact among those skilled in the art of molding processes that the best results in making molds are obtained by first carefully sifting and bedding sand adjacent to the pattern, and then tucking, pressing or ramming the succeeding courses of the mold. In other words, it is not desirable to bring hard ramming to bear directly upon a pattern surface, as undesirable creases, raised lines, ridges, etc., will result, as an evidence to lack of uniformity of the mold formation.

Up to the present time the prevailing defect of sand projecting or throwing devices for ramming sand molds is that there is no means of controlling or varying the intensity of the rammed sand with regard to its relations to the pattern, resulting in serious surface conditions which give rise to undesirable finishes of the castings poured therein.

The wads of sand thrown by the machines at present are uncontrollable and invariable, and there is no ready means to even approximate the methods of a skilled molder, who carefully beds his pattern to get the desired surfaces as described above.

One important object of the present invention is to provide novel means for controlling the intensity of the ramming action of sand throwing machines in such manner as to accomplish in a mechanical way what the experienced molder would do by hand.

A second important object of the invention is to provide an improved process of ramming molds by throwing wads of sand into a flask having a pattern therein.

With the above and other objects in view as will be hereinafter fully apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a front elevation, partly in section of a second form of the invention.

Figure 3 is a section on the line 3—3 of Figure 2.

Figure 4 is an enlarged detail section through an edge portion of the wad splitting device used in the second form, the section being taken on the line 4—4 of Figure 3 and extending somewhat above the plane of that Figure.

Figure 5 is a plan view of a bar supporting frame used with the second form.

Figure 6 is a side view of the frame shown in Figure 5.

The invention may be briefly described as the process of breaking into smaller parts a certain percentage of wads of sand ejected from a sand throwing machine or sand slinger in their paths to a molding flask and in the provision of suitable mechanical means to accomplish this.

Figure 1:
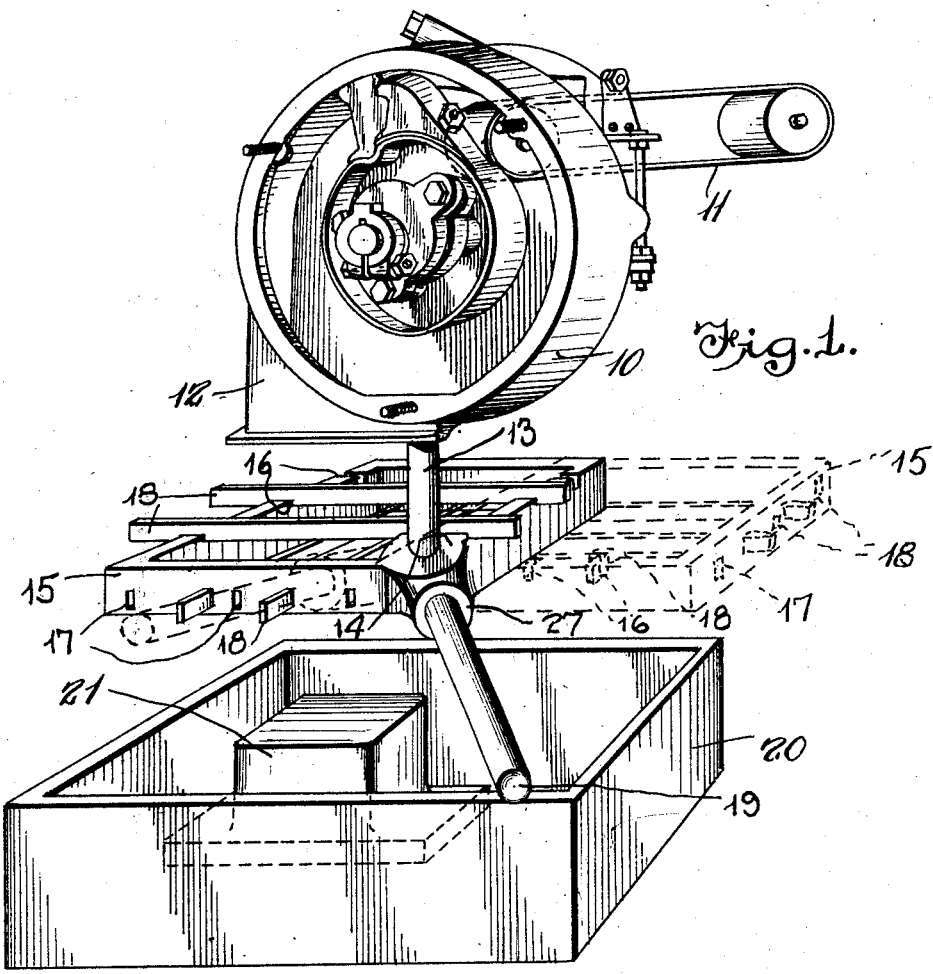
Figure 1 is a perspective view of part of a sand throwing machine or sand slinger having one form of the invention applied thereto and shown in operative position over a flask in full lines and in inoperative position in dotted lines.
Figures 7, 8:
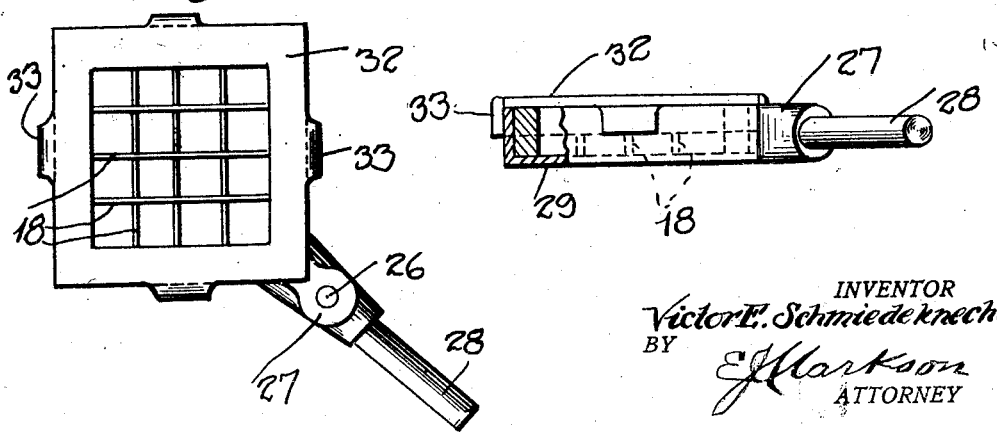
Figure 7 is a plan view of said frame partly removed from its housing.
Figure 8 is a side view of Figure 7 partly in section.

In order to illustrate how this may be accomplished I have illustrated in Figure 1 part of the head 10 and the feeder belt 11 of a sandslinger the construction of which is well known and needs no further description that is to say that by this mechanism a series of wads of compacted sand are thrown through the delivery nozzle 12.

In this form there is fixed to the head a downwardly extending post 13 whereon is revolubly mounted a boss 14 which is formed at one corner of a rectangular frame 15 having in the upper edges of opposite side walls the notches 16 and in the remaining side walls slots 17 intermediate the top and bottom edges of said frame.

In these notches and slots are held the disintegrating bars or knives 18 and extending from the boss is a handle 19 by which the frame and its bars may be swung beneath the nozzle 12 as in full lines or out of alinement with said nozzle as in dotted lines. It is to be noted that the sides are provided with a number of notches and slots and that these may be spaced as closely as desired so that a greater or less number of bars or knives may be used as may be desired. With these bars in position a reticulated structure is formed, the size of the reticulations depending on the number of bars used. The usual flask 20 and pattern 21 are provided beneath the delivery nozzle of the head.

The operation of this form of the device is like that of all the other forms and will be now described, it being understood that it applies equally to such other forms. As the wads are forcibly thrown down towards the flask from the head 10 they will pass through the reticulated structure just described. According to the size of the reticulations all or part of the wads will strike the knives or bars and be split into two or more parts, a certain amount of loose sand being also produced by this action. The wads are thus partly disintegrated and in this partially disintegrated condition are forcibly thrown into the flask. Since the size of the reticulations can be varied this partial disintegration can be varied in extent. Also by using a flat edged knife, a round edged knife or a sharp edged knife the amount of loose sand produced can be regulated and the character of the partial disintegration controlled. Thus the sand can be rammed around the pattern in larger or smaller wads and with or without loose sand so that effects equal to the best hand molding are produced.

In the form shown in Figures 2 to 8 inclusive there is provided a tubular housing 22 which has a channeled upper end arranged to embrace the flange of the nozzle 12 and to be secured thereto by the set screw 23 as best seen in Figure 2. At the lower end of this housing there is formed a quadrantal casing 24 having parallel upper and lower walls, the lower wall being provided with a delivery opening 25. Between these upper and lower walls at the center of the quadrant extends a pivot bolt 26 and within the casing is arranged a square knife or bar carrying frame having at one corner a boss 27 mounted revolubly on the bolt 26 and provided with a handle 28 by means of which the frame may be swung into and out of registry with the opening 25. In this form the frame consists of an outer frame member 29 carrying the boss and having sides which are L-shaped in cross section. Within this outer frame is removably seated an inner frame 30 which has rectangular sides provided with notches 31, one pair of opposite sides having there notches in the top edges while the remaining pair has similar notches in the bottom edges. In these notches are held the usual bars or knives 18 thus forming the reticulated structure common to all forms of the invention. On top of the frame 29 is mounted a cover rim 32 having downwardly extending lugs 33 which engage the outside of the frame 29 and prevent slipping of the rim with respect to the frame 29, the whole arrangement being such as to fit snugly between the top and bottom of the casing 24 so that the rim cannot be accidently displaced. Whenever it is desired to change the size of the reticulations the entire frame is swung clear of the casing, the rim and inner frame removed and another inner frame having differently spaced bars or knives inserted. After this the rim is replaced and the frame may be swung back into the housing.

Figure 9:
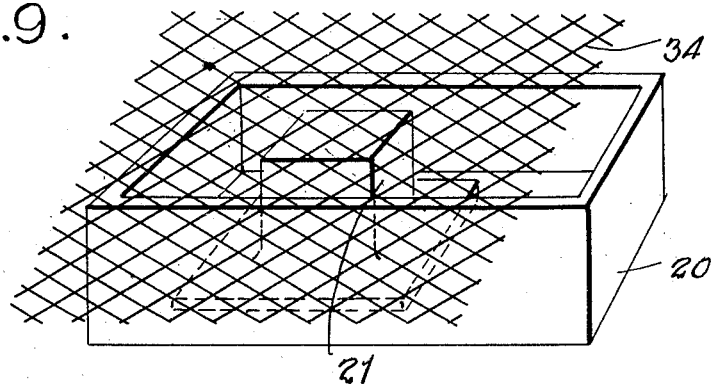
Figure 9 is a view of a flask having a third form of the invention applied thereto.

In the form of the invention shown in Figure 9 the wad disintegrating means consists of a simple sheet of expanded metal or wire mesh 34 of suitable size laid directly on the flask 20.

Figure 10:
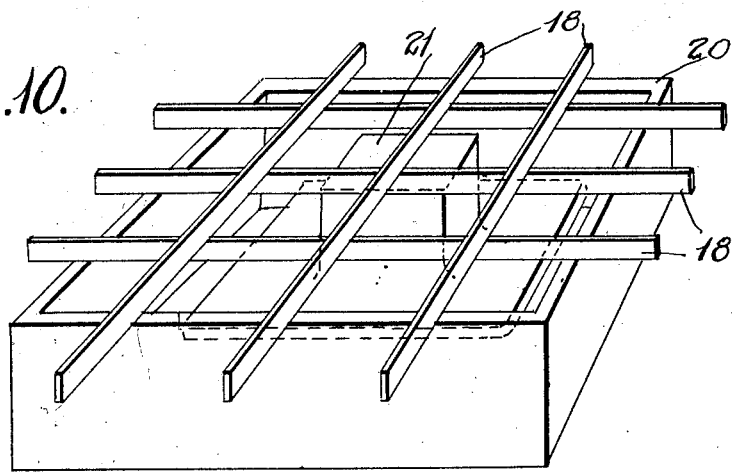
Figure 10 is a view similar to Figure 9 showing a fourth form of the invention.

Similarly the form shown in Figure 10 consists merely of two sets of bars or knives 18, one set being laid directly on the edges of the flask while the other set is laid crossways on the upper edges of the first set.

Figure 11:
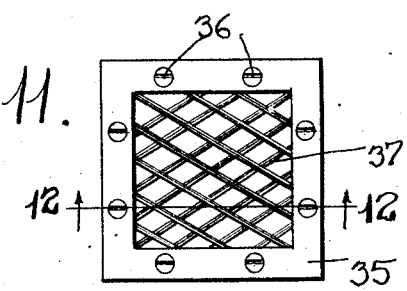
Figure 11 is a plan view of a fifth modification of the invention.
Figure 13:
Figure 13 is an end view of a modified form of splitting or disintegrating bar used herewith.
Figure 12:
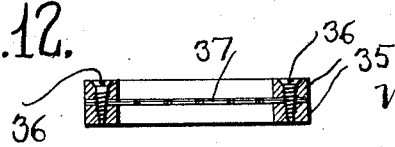
Figure 12 is a section on the line 12—12 of Figure 11.
Figure 14:
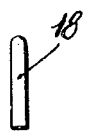
Figure 14 is an end view of a further modification of the bar.

In the form shown in Figures 11 and 12 a double frame consisting of upper and lower halves 35 has its parts held together by screws 36 and these halves clamp the edges of a suitable wire or expanded metal mesh 37. In this form the frame may be made to fit in the outer frame 29 previously described or may rest on the flask directly.

Thus in each form there is interposed between the flask and wad throwing device means for partially or wholly disintegrating part or all of the wads thrown from such device toward a flask.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with a sand wad throwing device and a molding flask receiving wads therefrom; of a wad disintegrating device pivotally mounted between the throwing device and flask and movable into and out of the paths of the wads passing from the throwing device to said flask.

2. The combination with a sand wad throwing device and a molding flask receiving wads therefrom; of a recticulated structure pivotally mounted between the throwing device and flask and movable into and out of the paths of the wads passing from the throwing device to said flask.

3. The combination with a sand wad throwing device and a molding flask receiving wads therefrom; of a frame supporting a reticulated structure and pivotally mounted between the throwing device and flask and movable into and out of the paths of the wads passing from the throwing device to said flask.

4. The combination with the throwing head of a sand throwing machine and its delivery nozzle; of a frame pivoted to said head at one side of the nozzle and arranged to swing into and out of registry with the nozzle, and a reticulated structure supported by said frame.

5. The combination with the throwing head of a sand wad throwing machine and its delivery nozzle; of a pivot post supported from said head at one side of the nozzle, a rectangular frame having a boss at one corner rotatably mounted on said pivot post whereby said frame may be swung into and out of registry with said nozzle, and a reticulated structure supported in said frame.

6. The combination with the throwing head of a sand wad throwing machine and its delivery nozzle; of a pivot post supported from said head at one side of the nozzle, a retangular frame having a boss at one corner rotatably mounted on said pivot post whereby said frame may be swung into and out of registry with said nozzle, a second frame removably mounted in the first frame, and elements crossing the space in the second frame to form reticulations.

7. The combination with the throwing head of a sand wad throwing machine and its delivery nozzle; of a pivot post supported from said head at one side of the nozzle, a rectangular frame having a boss at one corner rotatably mounted on said pivot post whereby said frame may be swung into and out of registry with said nozzle, a second frame removably mounted in the first frame, elements crossing the space in the second frame to form reticulations, a cover rim seated on the first frame to hold the second frame in position, and a quadrantal casing below the delivery nozzle and into and out of which the frames may swing.

8. In combination with a sandslinging machine, a baffle comprising a web with a series of spaced apart openings therethrough, means for moving said baffle relative to the sand discharge outlet of said sandslinging machine whereby when said baffle is in closed position the force of the sand is broken, causing the sand to be deflected and discharged upon the pattern mildly and smoothly, and whereby said baffle may be withdrawn to open position to permit the remainder of the sand to be discharged with the usual force into the mold.

9. The combination with a sand wad throwing device, of a movable wad disintegrating device located below the discharge outlet of said throwing device and through which the sand is directed.

In testimony whereof I affix my signature.

VICTOR E. SCHMIEDEKNECHT.